United States Patent [19]

Teluo

[11] 4,199,196
[45] Apr. 22, 1980

[54] BRAKE CONTROL VALVE

[75] Inventor: Yambe Teluo, Yokohama, Japan

[73] Assignee: The Nippon Air Brake Co., Ltd., Kanagawa, Japan

[21] Appl. No.: 876,358

[22] Filed: Feb. 9, 1978

[30] Foreign Application Priority Data

Feb. 18, 1977 [JP] Japan ................................. 52-17372

[51] Int. Cl.² ............................................ B60T 13/04
[52] U.S. Cl. ..................................... 303/6 C; 60/591; 303/22 R
[58] Field of Search ...................... 303/6 C, 6 R, 22 R, 303/115; 267/169; 60/581, 591; 188/349

[56] References Cited

U.S. PATENT DOCUMENTS

| | | | |
|---|---|---|---|
| 3,169,800 | 2/1965 | Oberthür | 303/22 R |
| 3,290,882 | 12/1966 | Oberthür | 303/22 R |
| 3,441,318 | 4/1969 | Bueler | 303/6 C |
| 3,467,440 | 9/1969 | Strein | 303/6 C |
| 3,650,569 | 3/1972 | Kawabe et al. | 303/6 C |
| 3,669,505 | 6/1972 | Falk | 303/6 C |
| 3,738,709 | 6/1973 | Stokes | 303/6 C |
| 3,843,213 | 10/1974 | Schroder | 303/6 C |
| 4,026,607 | 5/1977 | Hess | 303/6 C |

FOREIGN PATENT DOCUMENTS 2614080  10/1976  Fed. Rep. of Germany ........ 303/22 R Primary Examiner—Trygve M. Blix
Assistant Examiner—Reinhard J. Eisenzopf
Attorney, Agent, or Firm—McDougall, Hersh & Scott

[57] ABSTRACT

A dual system brake control valve for an automotive vehicle includes a main body having a pair of cylinder bores, a pair of inlets communicating with the cylinder bores each and a pair of outlets communicating with the cylinder bores each, the inlets being connected to a master cylinder for a dual system; a pair of stepped pistons slidably fitted into the cylinder bores, and each having bores communicating with the inlet and outlet, the stepped pistons each receiving a rightward pushing force due to the fluid pressure at the inlet, and a leftward pushing force due to the fluid pressure at the outlet; a spring guide contacting with the stepped pistons; a prestressed spring for pushing rightward the stepped pistons through the spring guide; and a pair of valves arranged in the bores of the stepped pistons, and put in the opened and closed conditions in response to the difference between the leftward pushing force to the stepped pistons each and the sum of the rightward pushing force and the tension force of the prestressed spring.

7 Claims, 2 Drawing Figures

BRAKE CONTROL VALVE

BACKGROUND OF THE INVENTION

1. Field of the Invention

This invention relates to a dual system brake control valve for an automotive vehicle which includes two brake fluid pressure systems or circuits to be controlled, and more particularly to a dual system brake control valve for an automotive vehicle in which, for example, a right front wheel and a left rear wheel are braked with one of the X-type two brake fluid pressure circuits, while a left front wheel and a right rear wheel are braked with another of the X-type two brake fluid pressure circuits, and in which the brake fluid pressure to both of the rear wheels is controlled.

2. Description of the Prior Art

Generally, a brake control valve of such a kind includes two separate control units independent on each other for the brake fluid pressure circuits. It is required for the brake control valve that the fluid pressures to be supplied to the rear wheels should be so controlled with the control parts as to be equal to each other in the two brake fluid pressure circuits.

When one of the two brake fluid pressure circuits is out of order, and no fluid pressure occurs in the one brake fluid pressure circuit, the vehicle should be braked only with another of the two brake fluid pressure circuits. In such a case, the fluid pressure should be so controlled with the control part as to be further higher in the other brake fluid pressure circuit than the fluid pressure when both of the two brake fluid pressure circuits are in order, or normal.

SUMMARY OF THE INVENTION

Accordingly, it is an object of this invention to provide a dual system brake control valve for an automotive vehicle which fulfills the above two requirements.

Another object of this invention is to provide a dual system brake control valve for an automotive vehicle which is simple in construction, and can be manufactured at low cost.

A further object of this invention is to provide a dual system brake control valve for an automotive vehicle which can be surely operated to brake the wheels.

In accordance with an aspect of this invention, a dual system brake control valve includes a main body having a pair of cylinder bores, a pair of inlets communicating with the cylinder bores each and a pair of outlets communicating with the cylinder bores each, the inlets being connected to a master cylinder for a dual system; a pair of stepped pistons slidably fitted into the cylinder bores, and each having bores communicating with the inlet and outlet, the stepped pistons each receiving a first pushing force in one direction due to the fluid pressure at the inlet, and a second pushing force in the opposite direction due to the fluid pressure at the outlet; a spring guide means contacting with the stepped pistons; a prestressed spring for pushing the stepped pistons through the spring guide means in the one direction; and a pair of valve means arranged in the bores of the stepped pistons, and put in the opened and closed conditions in responce to the difference between the second pushing force to be stepped pistons each and the sum of the first pushing force and the tension force of the prestressed spring.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

A dual system brake control valve according to one embodiment of this invention will be described with reference to the drawings.

Figure 1:
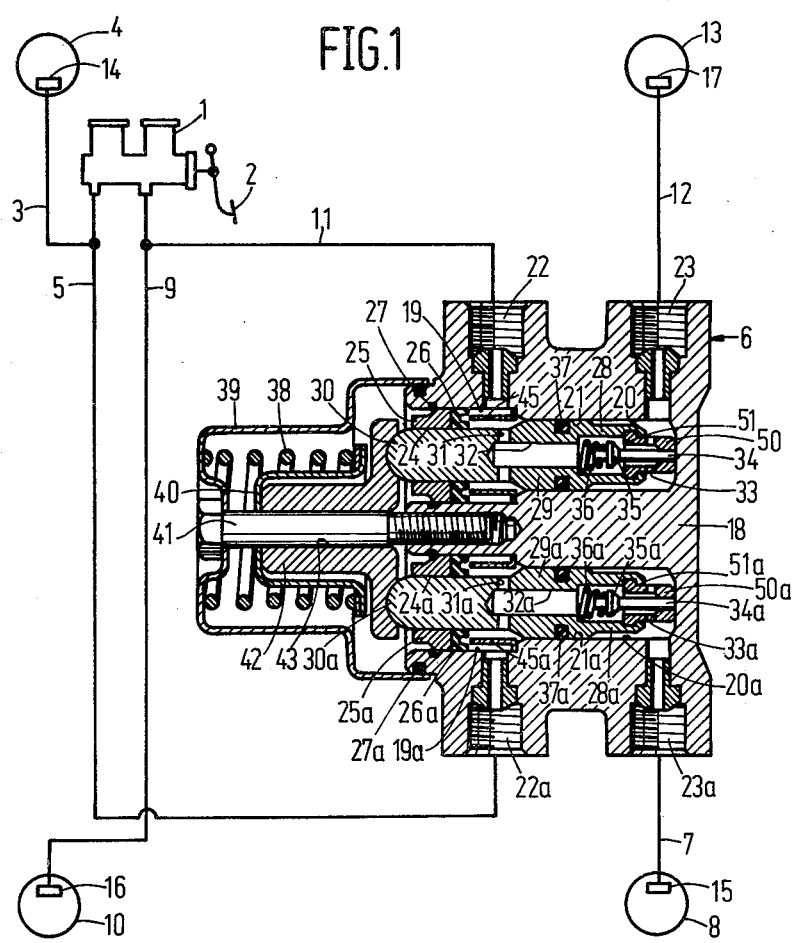
FIG. 1 is a cross-sectional view of a dual system brake control valve according to one embodiment of this invention, with schematically shown associated parts.
Figure 2:
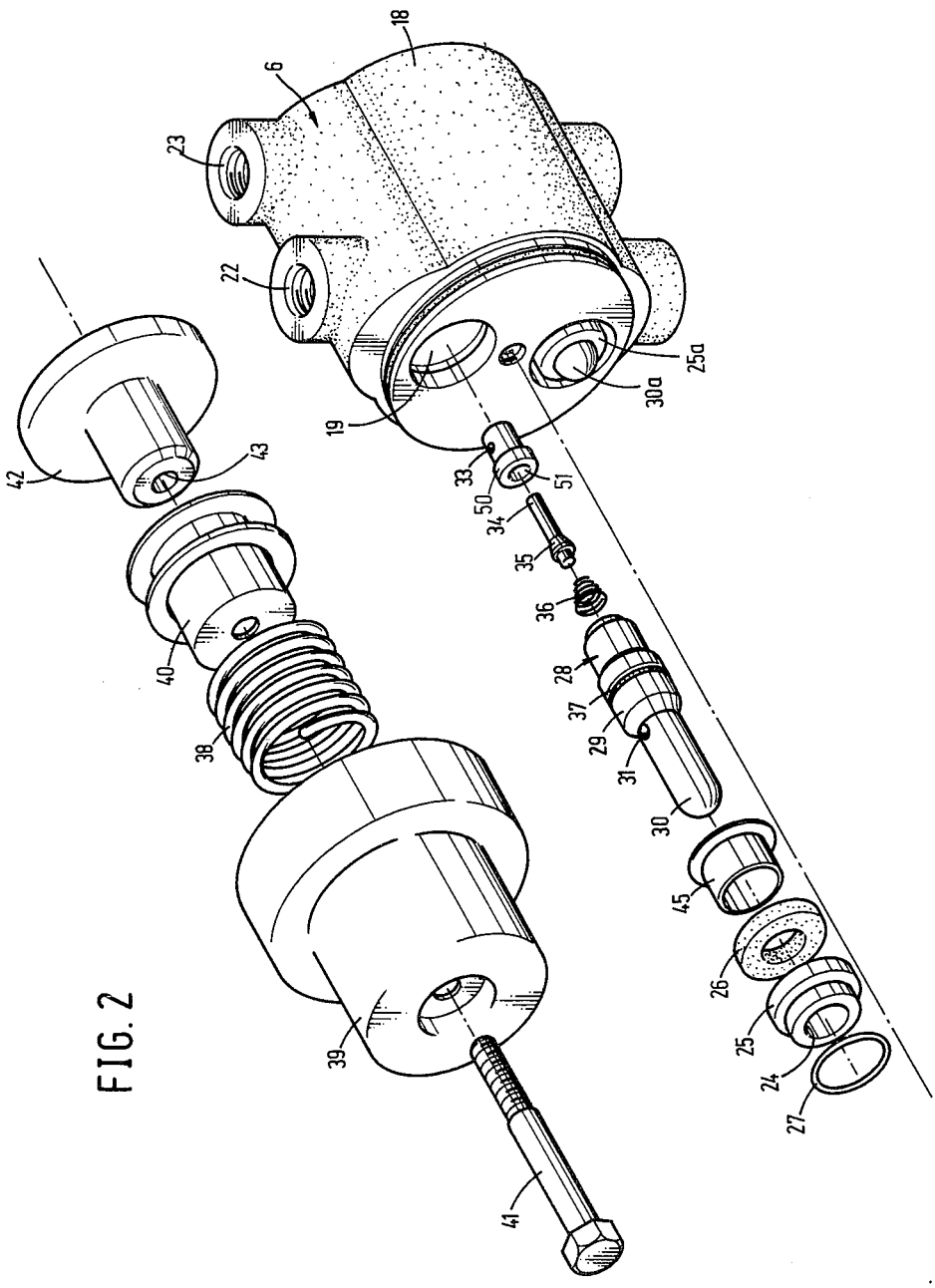
FIG. 2 is an exploded perspective view of the dual system brake control valve of FIG. 1.

A dual system type master cylinder 1 schematically shown in FIG. 1 is driven with a brake pedal 2. A fluid pressure for the one system, generated in the master cylinder 1, is supplied through a conduit 3 into a right front wheel 4, and further through a conduit 5, a brake control valve 6 according to this invention and a conduit 7 into a left rear wheel 8. A fluid pressure for the other system, similarly generated in the master cylinder 1 is supplied through a conduit 9 into a left front wheel 10, and further through a conduit 11, the brake control valve 6 and a conduit 12 into a right rear wheel 13. Wheel cylinders 14, 15, 16 and 17 are arranged in the wheels 4, 8, 10 and 13, respectively.

A pair of stepped cylinder bores 21 and 21a are made in a main body 18 of the brake control valve 6. The bores 21 and 21a consist of larger bores 19, 19a and smaller bores 20, 20a, conjoined with each other, respectively. The larger bores 19 and 19a are open at the left end surface of the main body 18. The stepped cylindrical bores 21 and 21a are parallel with each other. The main body 18 is provided at its upper portion with an inlet 22 and an outlet 23 for the brake fluid of the one system, and provided at its lower portion with an inlet 22a and an outlet 23a for the brake fluid of the other system. The conduit 11 from the master cylinder 1 is connected through the inlet 22, the one stepped cylinder hole 21 and the outlet 23 to the conduit 12. The conduit 5 from the master cylinder 1 is connected through the inlet 22a, the other stepped cylinder hole 21a and the outlet 23a to the conduit 7.

Cap members 25 and 25a having central piercing holes 24 and 24a are fitted into the openings of the stepped cylinder bores 21 and 21a. Stop rings 27 and 27a are so fitted between the larger bores 19, 19a of the stepped cylinder bores 21, 21a and the cap members 25, 25a, respectively, as to prevent the cap members 25 and 25a from falling out from the stepped cylinder bores 21 and 21a. A pair of stepped pistons 28 and 28a are slidably inserted into the stepped cylinder bores 21 and 21a. The stepped pistons 28 and 28a include larger portions 29, 29a and smaller portions 30, 30a. The larger portions 29 and 29a of the stepped pistons 28 and 28a are slidably fitted into the smaller bores 20 and 20a of the stepped cylinder bores 21 and 21a, while the smaller portions 30 and 30a of the stepped pistons 28 and 28a are slidably fitted into the central piercing holes 24 and 24a of the cap members 25 and 25a. Seal rings 26 and 26a are fluid-tightly fitted to the smaller portions 30 and 30a, contacting with the cap members 25 and 25a. Spacer members 45 and 45a are fixed to the stepped portions of the stepped cylinder bores 21 and 21a, and they prevent the seal rings 26 and 26a from moving away rightward when the fluid pressure of the adjacent chamber becomes extremely low.

Ancillary piston members 50 and 50a are fixed to the right ends of the stepped pistons 28 and 28a. A radial bore 31 and an axial bore 32 are made in the one stepped piston 28, and another radial bore 33 is made in the ancillary piston member 50. The one radial bore 31, the axial bore 32 and the other radial bore 33 are communicating with each other. One fluid path from the inlet 22 to the outlet 23 is formed by the one radial bore 31, the axial bore 32 and the other radial bore 33.

Similarly, a radial bore 31a and an axial bore 32a are made in the other stepped piston 28a, and another radial bore 33a is made in the ancillary piston member 50a. The one radial bore 31a, the axial bore 32a and the other radial bore 33a are communicating with each other. Another fluid path from the inlet 22a to the outlet 23a is formed by the one radial bore 31a, the axial bore 32a and the other radial bore 33a.

Valve members 35 and 35a having studs 34 and 34a are arranged at the end portions of the axial bores 32 and 32a of the stepped pistons 28 and 28a, respectively. The fluid paths between the axial bores 32, 32a and the other radial bores 33, 33a are closed and opened with the valve members 35 and 35a. The one valve member 35 is urged rightward by a spring 36, and so the end of its stud 34 contacts through the axial bore of the ancillary piston member 50 with the main body 18. Similarly, the other valve member 35a is urged rightward by a spring 36a, and so the end of its stud 34a contacts through the axial bore of the ancillary piston member 50a with the main body 18. Valve seats 51 and 51a for the valve members 35 and 35a are defined by inner ends of the ancillary piston members 50 and 50a, respectively. Seal rings 37 and 37a are fitted into the circular grooves made in the larger portions 29 and 29a of the stepped pistons 28 and 28a.

A cup-shaped cover 39 is so fixed to the main body 18 by a bolt 41 as to cover the left end surface of the main body 18. The bolt 41 passes through the central opening of the cover 39, and is screwed into the central portion of the main body 18. The cover 39 prevents dust from coming into the stepped cylinder bores 21 and 21a. The bolt 41 passes through an axial bore 43 of a spring guide member 42. The spring guide member 42 is slidably guided by the bolt 41 in the axial direction. A cup-shaped spring seat member 40 is so arranged as to be concentric with the spring guide member 42. The bolt 41 passes through the central opening of the spring seat member 40.

A coil spring 38 is extended in prestressed or preloaded condition between the bottom surface of the cup-shaped cover 39 and the flange portion of the spring seat member 40 to which a seat ring is fitted. Accordingly, the bottom surface of the cup-shaped spring seat member 40 is pushed to the top surface of the spring guide member 42. Round recesses for the stepped pistons 28 and 28a are formed in the flange portions of the spring guide member 42, and they are fitted to the round top ends of the smaller portions 30 and 30a of the stepped pistons 28 and 28a. The predetermined tension of the coil spring 38 is transmitted through the spring seat member 40 and the spring guide member 42 to the stepped pistons 28 and 28a.

According to this embodiment, the predetermined tension of the coil spring 38 is not transmitted directly to the spring guide member 42, but is transmitted through the cup-shaped spring seat member 40 to the spring guide member 42. When the coil spring 38 is excentrically tensioned by the reason of the manufacturing error, the excentricity of the tension of the coil spring 38 is reduced to the minimum at the top end of the spring guide member 42 contacting with the bottom surface of the cup-shaped spring seat member 40. Thus, the uniform tension force is transmitted through the spring guide member 42 to the stepped pistons 28 and 28a.

When the pedal 2 is actuated in the condition that both of the brake systems are in order, the fluid pressure generated for the one system in the master cylinder 1 is supplied through the conduit 3 to the wheel cylinder 14 of the right front wheel 4, and further through the conduit 5, the inlet 22a and outlet 23a of the brake control valve 6, and the conduit 7 to the wheel cylinder 15 of the left rear wheel 8, while the fluid pressure generated for the other system in the master cylinder 1 is supplied through the conduit 9 to the wheel cylinder 16 of the left front wheel 10, and further through the conduit 11, the inlet 22 and outlet 23 of the brake control valve 6, and the conduit 12 to the wheel cylinder 17 of the right rear wheel 13. Thus, the front wheels 4 and 10, and the rear wheels 8 and 13 are braked.

When the fluid pressure generated in the master cylinder 1 is not so high as to effect the control operation of the brake control valve 6, the components of the brake control valve 6 are put in the original positions shown in FIG. 1. The studs 34 and 34a of the valve members 35 and 35a contact with the bottoms of the stepped cylinder bores 21 and 21a, namely with the wall of the main body 18. The ancillary piston members 50 and 50a fixed to the right ends of the stepped pistons 28 and 28a similarly contact with the bottoms of the stepped cylinder bores 21 and 21a, since the stepped pistons 28 and 28a are pushed rightward through the spring seat member 40 and the spring guide member 42 by the prestressed spring 38. The valve members 35 and 35a are put in the opened conditions. Accordingly, the fluid pressure from the inlet 22 is led through the radial bore 31 and axial bore 32 of the stepped piston 28, and the radial bore 33 of the ancillary piston member 50 to the outlet 23, while the fluid pressure from the inlet 22a is led through the radial bore 31a and axial bore 32a of the stepped piston 28a, and the radial bore 33a of the ancillary piston member 50a to th outlet 23a.

The fluid pressure P generated in the master cylinder 1 becomes higher with the increase of the depressing force to the pedal 2, and it is transmitted through the inlets 22 and 22a into the cylinder bores 21 and 21a to act on the stepped pistons 28 and 28a. As the result, a leftward force $F_1$ is applied to each of the stepped pistons 28 and 28a, and it is represented by the following equation:

$$F_1 = S_1 \cdot P - (S_1 - S_2)P = S_2 \cdot P,$$

where $S_1$ represents the cross-sectional area of the larger portions 29 and 29a each of the stepped pistons 28 and 28a, and $S_2$ represents the cross-sectional area of the smaller portions 30 and 30a of the stepped pistons 28 and 28a. When a total force $2F_1 = 2S_2P$ applied to the stepped pistons 28 and 28a goes beyond the predetermined tension force F of the prestressed spring 38, the stepped pistons 28 and 28a are slided leftward to compress the spring 38. At that time, since the valve members 35 and 35a are urged rightward by the valve springs 36 and 36a, they are held at the original positions shown in FIG. 1. Accordingly, the valve members 35 and 35a contact with the valve seats 51 and 51a defined by the inner ends of the ancillary piston members 50 and 50a. Thus, the fluid paths from the axial bores 32 and 32a to the radial bores 33 and 33a are closed with the valve members 35 and 35a, respectively. The fluid pressure at that time is called "knee point pressure" or "control-starting pressure".

The fluid pressure $P_i$ at the side of the inlets 22 and 22a each becomes further higher with the increase of the depressing force to the pedal 2. The raised fluid pressure $P_i$ acts on the inlet side of the stepped pistons 28 and 28a each, namely the differential surface $S_1-S_2$ between the cross-sectional area of the larger portions 29 and 29a each of the stepped pistons 28 and 28a, and the cross-sectional area of the smaller portions 30 and 30a each of the stepped pistons 28 and 28a. As the result, a rightward force is applied to the stepped pistons 28 and 28a each to slide the latter rightward, in cooperation with the spring 38. The valve members 35 and 35a are again put in the opened conditions.

The fluid pressure is again transmitted to the outlets 23 and 23a. When the leftward forces to the stepped pistons 28 and 28a applied by the fluid pressure of the outlet sides become larger than the sum of the rightward forces to the stepped pistons 28 and 28a applied by the fluid pressure of the inlet sides and the tension force F of the prestressed spring 38, the stepped pistons 28 and 28a are slided leftward, and the valve members 35 and 35a are again put in the closed conditions. In the above-described manner, the closed and opened conditions of the valve members 35 and 35a are repeated.

The relationship between the fluid pressure $P_O$ of the outlet side and the fluid pressure $P_i$ of the inlet side is represented by the following equation:

$$2P_0S_1 = 2P_i(S_1 - S_2) + F$$

$$\therefore P_0 = \frac{S_1 - S_2}{S_1} P_i + \frac{F}{2S_1}$$

Therefore, the fluid pressure $P_O$ of the outlet side increases at the reduced rate of $$\frac{S_1 - S_2}{S_1} (< 1)$$

with the fluid pressure $P_i$ of the inlet side, where the fluid pressure $P_i$ of the inlet side is so high as to effect the control operation of the brake control valve 6.

According to this embodiment, there is a little clearance between the bore 43 of the spring guide member 42 and the bolt 41 in consideration of the case that the valve members 35 and 35a are not put into the closed conditions at the same time by the reason of any manufacturing error. Accordingly, the spring guide member 42 can slightly tilt relative to the bolt 41. Both of the valve members 35 and 35a can be surely put in the closed conditions, and pushing forces can be always eiuivalently and uniformly applied to the stepped pistons 28 and 28a.

Next, there will be described operation of the brake control valve 6 in the case that an accidental breakage occurs in one of the brake fluid pressure system, for example, in the conduit 5.

The fluid pressure generated in the master cylinder 1 with the depressing of the pedal 2 is supplied through the conduit 11, the inlet 22, the radial bore 31 and axial bore 32 of the stepped piston 28, the radial bore 33 of the ancillary piston member 50, the outlet 23 and the conduit 12 to the wheel cylinder 17 of the right rear wheel 13, and further through the conduit 9 to the wheel cylinder 16 of the left front wheel 10. However, since the conduit 5 in the other system breaks, no fluid pressure is applied to the conduits 3 and 5, and therefore to the inlet 22a of the brake control valve 6. Accordingly, the prestressed spring can be compressed leftward only by the one stepped piston 28 to which the fluid pressure is supplied.

The leftward force applied through the spring guide member 42 and the spring seat member 40 to the prestressed spring 38 when only one of the systems is in order, is half as large as that when both of the systems are in order, for the same fluid pressure P. Accordingly, when the fluid pressure is raised up to the value which is so large as to effect the control operation of the brake control valve 6 in the case that both of the systems have been in order, the stepped piston 28 is still held at the shown position, and the valve member 35 remains at the opened condition. The fluid pressure from the inlet 22 is led to the outlet 23, as it is. In other words, the inlet-side fluid pressure is equal to the outlet-side fluid pressure.

When the leftward force applied to the stepped piston 28 increases over the tension force F of the prestressed spring 28 with the raise of the fluid pressure, the stepped piston 28 is slided leftward. However, the other stepped piston 28 rests at the shown position. When the spring guide member 42 is pushed leftward only by the stepped piston 28, it is first slightly tilted to the bolt 41, due to the small clearance between the bore 43 of the spring guide member 42 and the bolt 41, and then it is moved leftward, guided by the bolt 41. The other stepped piston 28a is separated from the spring guide member 42. Only the one stepped piston 28 is slided leftward against the prestressed spring 38.

With the leftward slide of the stepped piston 28, the valve member 35 contacts with the valve seat 51 of the ancillary piston member 50, to be put in the closed condition. The fluid path to the outlet 23 is closed. The control operation of the brake control valve 6 starts. The fluid pressure at that time, namely the control-starting fluid pressure amounts to $F/S_2$ which is twice as high as the control-starting fluid pressure obtained when both of the systems are in order. With the further rise of the fluid pressure at the inlet 22, the stepped piston 28 is slided rightward to put the valve member 35 into the opened condition. The fluid path to the outlet 23 is again opened. The fluid pressure is transmitted to the outlet 23. With the rise of the fluid pressure at the outlet 23, the stepped piston 28 is again slided leftward to put the valve member 35 into the closed condition. Thus, the closed and opened conditions of the valve 35 are repeated. The outlet-side fluid pressure to the wheel-cylinder 17 of the right rear wheel 13 is raised at the reduced rate of $$\frac{S_1 - S_2}{S_1} (< 1)$$

with the increase of the inlet-side fluid pressure.

In the above described brake control valve, the stepped pistons 28 and 28a arranged in parallel with each other are biased by only one prestressed spring 38. When both of the systems are in order, or normal, the same fluid pressures can be supplied to the wheel cylinders 15 and 17 of the rear wheels with the control operation of the brake control valve. And when one of the systems is out of order, the control-starting fluid pressure is twice as high as that when both of the systems are in order, and so sufficient fluid pressure as to brake the automotive vehicle is supplied to one of the rear wheels, with the control operation of the brake control valve.

Only one prestressed spring, not two prestressed springs, is required for the two stepped pistons 28 and 28a. It is troublesome to adjust the tensions of the two springs to the same predetermined valves. However, it is simple to adjust the tension of one spring to the predetermined value.

Further, according to the above described embodiment, the tension of the spring 38 can be simply adjusted by screwing the bolt 41 into the central portion of the main body 18.

The brake control valve according to this invention can be simply manufactured at low cost.

While the preferred embodiment has been described, variations thereto will occur to those skilled in the art within the scope of the present inventive concepts which are delineated by the following claims.

For example, the guide member 42 is guided or supported by the bolt 41 in the above described embodiment. However, the guide member 42 may be guided or supported by the cover 39. In that case, a projection is so formed on the bottom of the cover 39 as to be inserted into the bore of the guide member 42, and the cover 38 may be fixed at its circumferential edge to the main body 18 by screws.

What is claimed is:

1. A dual system brake control valve comprising:
   (a) a main body having a pair of cylinder bores, a pair of inlets communicating with said cylinder bores, and a pair of outlets communicating with said cylinder bores, said inlets being connected to a master cylinder for a dual system;
   (b) a pair of stepped pistons slidably fitted into said cylinder bores, each piston having bores communicating with a respective inlet and outlet, said stepped pistons each receiving a first pushing force in one direction due to the fluid pressure at said inlet, and a second pushing force in the opposite direction due to the fluid pressure at said outlet;
   (c) a spring guide means contacting said stepped pistons, a support rod fixed to said main body, said spring guide means being slidably supported by said rod;
   (d) a prestressed spring engaging said guide means for pushing said stepped pistons in said one direction; and
   (e) a valve member arranged in the bore of each stepped piston, each valve member being in the opened or closed condition depending on the difference between said second pushing force, and the sum of said first pushing force and the force of said prestressed spring.

2. A dual system brake control valve according to claim 1 in which said support rod comprises a bolt screwed to said main body midway between said cylinder bores.

3. A dual system brake control valve according to claim 2 including means fixing one end of said prestressed spring relative to said main body, the other end of said prestressed spring pushing said stepped pistons in said one direction.

4. A dual system brake control valve according to claim 3 including a cover fixed to said main body covering the openings of said cylinder bores, said prestressed spring extending between said cover and said guide means, said cover providing said means for fixing said one end of said spring.

5. A dual system brake control valve according to claim 4, in which said spring guide means further includes a seat member consisting of a cylindrical portion and a flange portion formed integrally and concentrically with said cylindrical portion, said seat member being arranged concentrically with said guide member, said prestressed spring extending between said cover and said seat member whereby the tension force of said prestressed spring is transmitted through said seat member and guide member to said stepped pistons.

6. A dual system brake control valve according to claim 3, in which said spring guide means includes a guide member consisting of a cylindrical portion and a flange portion formed integrally and concentrically with said cylindrical portion, and a central piercing hole defined by said guide member, said bolt being inserted through said piercing hole of the guide member to support the latter, and said stepped pistons contacting said flange portion of the guide member.

7. A dual system brake control valve according to claim 6, wherein the diameter of said piercing hole exceeds the diameter of said bolt whereby relative tilting movement is permitted.

* * * * *

UNITED STATES PATENT AND TRADEMARK OFFICE
CERTIFICATE OF CORRECTION

PATENT NO. : 4,199,196
DATED : April 22, 1980
INVENTOR(S) : Yambe Teluo

It is certified that error appears in the above—identified patent and that said Letters Patent is hereby corrected as shown below:

On the Cover Page the Assignee, should read:

-- The Nippon Air Brake Co., Ltd., Kobe-shi, Japan --.

Column 7, line 37, "38" should read -- 39 --.

Signed and Sealed this

Third Day of February 1981

[SEAL]

Attest:

RENE D. TEGTMEYER

Attesting Officer

Acting Commissioner of Patents and Trademarks